(12) United States Patent
Son (10) Patent No.: US 11,688,864 B2
(45) Date of Patent: Jun. 27, 2023

(54) FUEL CELL SYSTEM

(71) Applicants: HYUNDAI MOTOR COMPANY, Seoul (KR); KIA CORPORATION, Seoul (KR)

(72) Inventor: Dong Wook Son, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/666,945

(22) Filed: Feb. 8, 2022

(65) Prior Publication Data
US 2023/0067675 A1    Mar. 2, 2023

(30) Foreign Application Priority Data
Aug. 25, 2021   (KR) .................. 10-2021-0112601

(51) Int. Cl.
*H01M 8/04*      (2016.01)
*H01M 8/04111*   (2016.01)
*H01M 8/04746*   (2016.01)

(52) U.S. Cl.
CPC .... *H01M 8/04111* (2013.01); *H01M 8/04761* (2013.01); *H01M 2220/20* (2013.01)

(58) Field of Classification Search
CPC ............. H01M 8/04111; H01M 8/04761
See application file for complete search history.

(56) References Cited

U.S. PATENT DOCUMENTS

2010/0221642 A1*   9/2010   Frahm .................. B64D 41/00
                                                         429/512
2018/0134413 A1*   5/2018   Halsey .................. B64F 1/364

FOREIGN PATENT DOCUMENTS

JP         2007-076986 A      3/2007

OTHER PUBLICATIONS

United Nations, Agreement, Addendum 133—Regulation No. 134, Uniform provisions concerning the approval of motor vehicles and their components with regard to the safety-related performance of hydrogen-fuelled vehicles (HFCV), Jun. 25, 2015.

* cited by examiner

*Primary Examiner* — Olatunji A Godo
(74) *Attorney, Agent, or Firm* — McDonnell Boehnen Hulbert & Berghoff LLP (57) ABSTRACT

The present disclosure relates to a fuel cell system including a discharge line configured to discharge exhaust gas, which is discharged from a fuel cell stack, to the outside, and a pneumatic branch line having an outlet end connected to the discharge line, and an inlet end connected to a pneumatic supply unit configured to supply air to a pneumatic part of a mobility vehicle, the pneumatic branch line being configured to selectively supply the air from the pneumatic supply unit to the discharge line, thereby effectively reducing a hydrogen concentration in the exhaust gas discharged from the fuel cell stack.

10 Claims, 7 Drawing Sheets

FUEL CELL SYSTEM

CROSS REFERENCE TO RELATED APPLICATIONS

This application claims priority to and the benefit of Korean Patent Application No. 10-2021-0112601 filed in the Korean Intellectual Property Office on Aug. 25, 2021, the entire contents of which are incorporated herein by reference.

TECHNICAL FIELD

The present disclosure relates to a fuel cell system, and more particularly, to a fuel cell system capable of reducing a hydrogen concentration in exhaust gas discharged from a fuel cell stack.

BACKGROUND

A fuel cell vehicle (e.g., a hydrogen fuel cell vehicle) is configured to autonomously generate electricity by means of a chemical reaction between fuel (hydrogen) and air (oxygen) and travel by operating a motor.

In general, the fuel cell vehicle may include a fuel cell stack configured to generate electricity by means of an oxidation-reduction reaction between hydrogen and oxygen, a fuel supply device configured to supply fuel (hydrogen) to the fuel cell stack, an air supply device configured to supply the fuel cell stack with air (oxygen) which is an oxidant required for an electrochemical reaction, and a thermal management system (TMS) configured to discharge heat, which is generated from the fuel cell stack and power electronic parts of the vehicle, to the outside of the system and control temperatures of the fuel cell stack and the power electronic parts.

Discharge water (condensate water) and exhaust gas (e.g., unreacted hydrogen), which are produced during the operation of the fuel cell stack, may be discharged to the outside through an exhaust pipe.

Meanwhile, a large amount of hydrogen may be contained in the exhaust gas discharged from the fuel cell stack (e.g., the exhaust gas discharged during a purge process for adjusting a hydrogen concentration in the fuel cell stack). When a hydrogen concentration in the exhaust gas increases to a certain level or higher, the risk of explosion increases. Accordingly, regulations are defined to force the hydrogen concentration in the exhaust gas discharged from the fuel cell to be at a predetermined level or lower.

As one of the methods of reducing a hydrogen concentration in the exhaust gas discharged from the fuel cell stack, there has been proposed a method of reducing a concentration of residual hydrogen in the fuel cell stack (e.g., a concentration of hydrogen remaining in the fuel cell when the fuel cell does not operate) or reducing a supply rate of air to be supplied to the fuel cell stack.

However, if a concentration of residual hydrogen in the fuel cell stack is decreased to a certain level or lower, there is a problem in that oxidation occurs in the fuel cell stack, which causes a deterioration in durability. Further, if the supply rate of air to be supplied to the fuel cell stack is decreased, there is a problem in that it is difficult to ensure a rapid increase in output of the fuel cell stack.

As other methods of reducing a hydrogen concentration in the exhaust gas discharged from the fuel cell stack, there have been proposed a method of filtering out hydrogen from the exhaust gas using a separate filter and a method of forcibly supplying air into an exhaust pipe through which the exhaust gas is discharged.

However, an expensive filter or fan (air supply fan) needs to be additionally provided to filter out hydrogen from the exhaust gas or forcibly supply air into the exhaust pipe, which causes problems of an increase in costs, a complicated structure, and deteriorations in degree of design freedom and spatial utilization.

Therefore, recently, various types of research are conducted to simplify the structure while effectively reducing the hydrogen concentration in the exhaust gas discharged from the fuel cell, but the research result is still insufficient. Accordingly, there is a need for development to simplify the structure while effectively reducing the hydrogen concentration in the exhaust gas discharged from the fuel cell.

SUMMARY

The present disclosure has been made in an effort to provide a fuel cell system capable of reducing a hydrogen concentration in exhaust gas discharged from a fuel cell stack.

In particular, the present disclosure has been made in an effort to reduce a hydrogen concentration in exhaust gas discharged from a fuel cell stack using air to be supplied to pneumatic parts of a vehicle.

The present disclosure has also been made in an effort to simplify a structure and improve spatial utilization and a degree of design freedom.

The present disclosure has also been made in an effort to improve safety and reliability.

The present disclosure has also been made in an effort to simplify a manufacturing process and reduce costs.

The present disclosure has also been made in an effort to ensure durability of a fuel cell stack and prolong a lifespan of the fuel cell stack.

The objects to be achieved by the embodiments are not limited to the above-mentioned objects, but also include objects or effects that may be understood from the solutions or embodiments described below.

An exemplary embodiment of the present disclosure provides a fuel cell system including a discharge line configured to discharge exhaust gas, which is discharged from a fuel cell stack, to the outside, and a pneumatic branch line having an outlet end connected to the discharge line, and an inlet end connected to a pneumatic supply unit configured to supply air to a pneumatic part of a mobility vehicle, the pneumatic branch line being configured to selectively supply the air from the pneumatic supply unit to the discharge line.

This is to reduce a hydrogen concentration in the exhaust gas discharged from the fuel cell stack.

That is, a large amount of hydrogen may be contained in the exhaust gas discharged from the fuel cell stack (e.g., the exhaust gas discharged when the fuel cell stack initially starts, or the exhaust gas discharged during a purge process for adjusting a hydrogen concentration in the fuel cell stack). When a hydrogen concentration in the exhaust gas increases to a certain level or higher, the risk of explosion increases. Therefore, the hydrogen concentration in the exhaust gas needs to be maintained at a predetermined level or lower.

In the related art, as a method of reducing the hydrogen concentration in the exhaust gas discharged from the fuel cell stack, there has been proposed a method of reducing a concentration of residual hydrogen in the fuel cell stack (e.g., a concentration of hydrogen remaining in the fuel cell stack when the fuel cell stack does not operate) or reducing a supply rate of air to be supplied to the fuel cell stack.

However, if a concentration of residual hydrogen in the fuel cell stack is decreased to a certain level or lower, there is a problem in that oxidation occurs in the fuel cell stack, which causes a deterioration in durability. Further, if the supply rate of air to be supplied to the fuel cell stack is decreased, there is a problem in that it is difficult to ensure a rapid increase in output of the fuel cell.

In addition, in the related art, as other methods of reducing the hydrogen concentration in the exhaust gas discharged from the fuel cell stack, there have been proposed a method of filtering out hydrogen from the exhaust gas using a separate filter and a method of forcibly supplying air into an exhaust pipe through which the exhaust gas is discharged. However, an expensive filter or fan (air supply fan) needs to be additionally provided to filter out hydrogen from the exhaust gas or forcibly supply air into the exhaust pipe, which causes problems of an increase in costs, a complicated structure, and deteriorations in degree of design freedom and spatial utilization.

However, according to the embodiment of the present disclosure, a part of the air to be supplied to the pneumatic parts of the vehicle may be supplied to the discharge line along the pneumatic branch line. Therefore, it is possible to obtain an advantageous effect of reducing a hydrogen concentration in the exhaust gas discharged to the outlet of the discharge line, thereby reducing a risk of explosion.

Moreover, according to the embodiment of the present disclosure, it is not necessary to additionally provide a separate fan (an air supply fan) or pump for forcibly supplying the air to reduce the hydrogen concentration in the exhaust gas. Therefore, it is possible to obtain an advantageous effect of simplifying the structure and improving the degree of design freedom and the spatial utilization.

The pneumatic supply unit may have various structures capable of supplying the air to the pneumatic parts.

For example, the pneumatic supply unit may include an air compressor configured to compress the air; a storage tank configured to store the air compressed by the air compressor, and a pneumatic line configured to connect the storage tank and the pneumatic part and supply the air from the storage tank to the pneumatic part, and the pneumatic branch line may connect the pneumatic line and the discharge line.

As described above, according to the embodiment of the present disclosure, the pneumatic branch line may be connected to the pneumatic line (the air compressor) of the pneumatic supply unit. Therefore, it is possible to supply the air to the discharge line without using an air compressor for a reaction air that supplies the reaction air to the fuel cell stack. In other words, since it is not necessary to use the air compressor for a reaction air to supply the reaction air to the fuel cell stack, it is possible to inhibit an increase in the load of the air compressor for a reaction air and prevent a decrease in pressure of air to be supplied to the fuel cell stack.

In particular, the fuel cell system may include a regulator disposed on the pneumatic line and configured to reduce a pressure of the air being supplied along the pneumatic line.

According to the exemplary embodiment of the present disclosure, the fuel cell system may include a drain port disposed on the discharge line and configured to discharge condensate water, which is discharged from the fuel cell stack, to the outside.

In particular, the outlet end of the pneumatic branch line may be disposed at an upstream side of the drain port and connected to the discharge line.

Since the outlet end of the pneumatic branch line is disposed at the upstream side of the drain port and connected to the discharge line as described above, the air may be supplied to the exhaust gas before the exhaust gas is discharged through the drain port, thereby reducing a hydrogen concentration in the exhaust gas. Therefore, it is possible to obtain an advantageous effect of reducing the hydrogen concentration in the exhaust gas discharged through the drain port.

In addition, the outlet end of the pneumatic branch line may be connected to the discharge line and spaced apart from the drain port within a preset reference distance.

Since the outlet end of the pneumatic branch line is spaced apart from the drain port within the preset reference distance as described above, the air may be supplied before the exhaust gas is discharged through the drain port, such that the exhaust gas discharged through the drain port may maintain a maximally low hydrogen concentration.

The reference distance (the distance between the drain port and the outlet end of the pneumatic branch line) may be variously changed in accordance with required conditions and design specifications. In particular, the reference distance may be 50 mm to 150 mm.

According to the exemplary embodiment of the present disclosure, the outlet end of the pneumatic branch line may be disposed to be perpendicular to the discharge line.

Since the outlet end of the pneumatic branch line is connected to be perpendicular to the discharge line as described above, the air supplied into the discharge line along the pneumatic branch line may perpendicularly collide with an inner surface of the discharge line and then be effectively dispersed (diffused). Therefore, it is possible to obtain an advantageous effect of further improving efficiency in mixing the exhaust gas and the air and more effectively reducing the hydrogen concentration in the exhaust gas.

According to the exemplary embodiment of the present disclosure, the fuel cell system may include an on-off valve disposed on the pneumatic branch line and configured to selectively open or close the pneumatic branch line.

According to the exemplary embodiment of the present disclosure, the fuel cell system may include a processor configured to operate the air compressor when a pressure of the air (an internal pressure of the storage tank) is lower than a preset reference pressure before the on-off valve opens the pneumatic branch line.

Since the air compressor operates when the pressure of the air is lower than the preset reference pressure before the pneumatic branch line is opened, as described above, the air with a sufficient pressure (flow rate) may be supplied to the discharge line when the pneumatic branch line is opened.

According to the exemplary embodiment of the present disclosure, the fuel cell system may include an air supply line configured to supply reaction air to the fuel cell stack, and a bypass line configured to connect the air supply line and the discharge line and selectively allow the reaction air to flow from the air supply line to the discharge line.

As described above, according to the embodiment of the present disclosure, the reaction air supplied to the air supply line may be supplied to the discharge line along the bypass line without passing through the fuel cell stack at the same time when a part of the air to be supplied to the pneumatic parts of the vehicle is supplied to the discharge line along the pneumatic branch line, such that a total amount of air to be supplied to the discharge line (a total supply amount of air and reaction air) may further increase. Therefore, it is possible to obtain an advantageous effect of more effectively reducing the hydrogen concentration in the exhaust gas discharged through the discharge line.

DETAILED DESCRIPTION

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 5, a fuel cell system 10 according to the embodiment of the present disclosure includes a discharge line 120 configured to discharge exhaust gas EG, which is discharged from a fuel cell stack 20, to the outside, and a pneumatic branch line 140 having an outlet end connected to the discharge line 120, and an inlet end connected to a pneumatic supply unit 200 configured to supply air Air 2 to pneumatic parts 30 of a mobility vehicle, the pneumatic branch line 140 being configured to selectively supply the air Air 2 from the pneumatic supply unit 200 to the discharge line 120.

For reference, the fuel cell system 10 according to the embodiment of the present disclosure may be applied to various mobility vehicles such as automobiles, ships, and airplanes. The present disclosure is not restricted or limited by the types and properties of subjects (mobility vehicles) to which the fuel cell system 10 is applied.

Hereinafter, an example will be described in which the fuel cell system 10 according to the embodiment of the present disclosure is applied to environmentally friendly vehicles such as hybrid vehicles and/or electric vehicles that obtain driving power from electrical energy.

For reference, the fuel cell stack 20 refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may have various structures capable of producing electricity by means of an oxidation-reduction reaction between fuel (e.g., hydrogen) and an oxidant (e.g., air).

For example, the fuel cell may include a membrane electrode assembly (MEA) (not illustrated) having catalyst electrode layers in which electrochemical reactions occur and which is attached to two opposite sides of an electrolyte membrane through which hydrogen ions move, a gas diffusion layer (GDL) (not illustrated) configured to uniformly distribute reactant gases and transfer generated electrical energy, a gasket (not illustrated) and a fastener (not illustrated) configured to maintain leakproof sealability for the reactant gases and a coolant and maintain an appropriate fastening pressure, and a separator (bipolar plate) (not illustrated) configured to move the reactant gases and the coolant.

More specifically, in the fuel cell, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons transmitted through the separator meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

Figure 1:
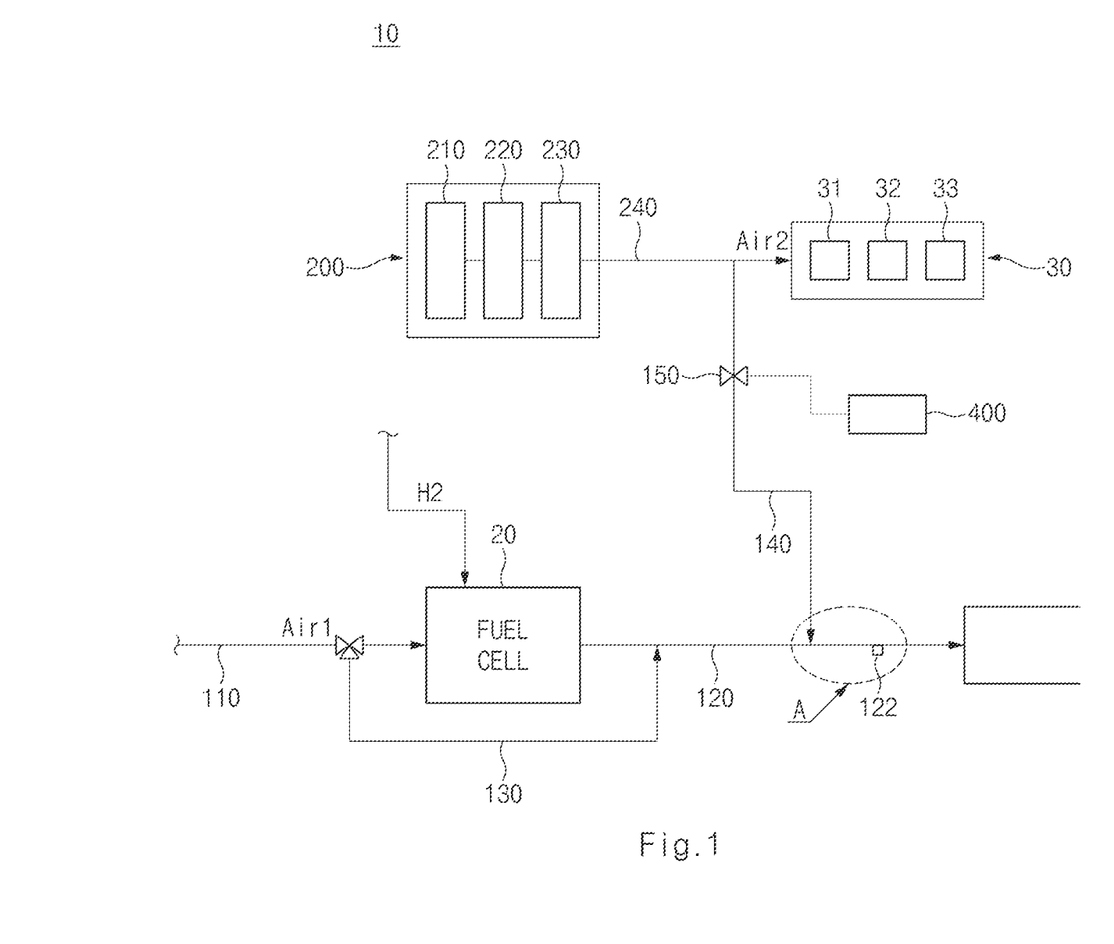
FIG. 1 is a view for explaining a fuel cell system according to an embodiment of the present disclosure.

According to the exemplary embodiment of the present disclosure, the fuel cell system 10 may include an air supply line 110 configured to supply reaction air Air 1 to the fuel cell stack 20.

The air supply line 110 may be connected to the fuel cell stack 20 by means of various structures capable of supplying the reaction air Air 1 to the fuel cell stack 20. The present disclosure is not restricted or limited by the structure of the air supply line 110.

In addition, an air compressor (not illustrated) for reaction air may be disposed in the air supply line 110 and compress the reaction air Air 1 to be supplied to the fuel cell stack 20.

Meanwhile, the electrolyte membrane of the membrane electrode assembly needs to be maintained at a predetermined humidity or higher so that the fuel cell stack 20 normally operates.

To this end, the reaction air Air 1 being supplied along the air supply line 110 may pass through a humidifier (not illustrated), and the reaction air Air 1 to be supplied to the fuel cell stack 20 along the air supply line 110 may be humidified while passing through the humidifier. In this case, the process of humidifying the reaction air Air 1 is defined as a process of increasing the humidity of the reaction air Air 1.

For example, the humidifier may humidify air (dry air), to be supplied to the fuel cell stack 20, using air (moist air) discharged from the fuel cell stack 20.

The humidifier may have various structures capable of humidifying dry air (reaction air) using the air (moist air) discharged from the fuel cell stack 20. The present disclosure is not restricted or limited by the structure of the humidifier.

The discharge line 120 serves to discharge the exhaust gas EG discharged from the fuel cell stack 20 to the outside.

The discharge line 120 may have various structures capable of discharging the exhaust gas EG. The present disclosure is not restricted or limited by the structure and shape of the discharge line 120.

For example, the discharge line 120 may have a plurality of outlet tubes (not illustrated). According to another embodiment of the present disclosure, the discharge line may have only a single outlet tube.

For example, the discharge line 120 may have a circular cross-section having a uniform size, as a whole. According to another embodiment of the present disclosure, the discharge line may have a quadrangular cross-section or other cross-sectional shapes. Alternatively, an enlarged outlet having an enlarged cross-sectional area may be disposed on the outlet tube of the discharge line.

The pneumatic branch line 140 serves to selectively supply the air to the discharge line 120 from the pneumatic supply unit 200 configured to supply the air Air 2 to the pneumatic parts 30.

More specifically, one end (an inlet end) of the pneumatic branch line 140 may be connected to the pneumatic supply unit 200, and the other end (outlet end) of the pneumatic branch line 140 may be connected to the discharge line 120. A part of the air Air 2, which is to be supplied to the pneumatic parts 30 from the pneumatic supply unit 200, may be supplied to the discharge line 120 along the pneumatic branch line 140.

In this case, the pneumatic part 30 of the vehicle may be understood as a component that uses pneumatic pressure as an energy source among the components of the vehicle. The present disclosure is not restricted or limited by the type and number of the pneumatic parts 30 of the vehicle.

For example, the pneumatic parts 30 may include one or more of a brake 31 (e.g., a parking brake) configured to apply a braking force to the vehicle, an air suspension 32, and a transmission gear shift (TGS) 33.

Figure 2:
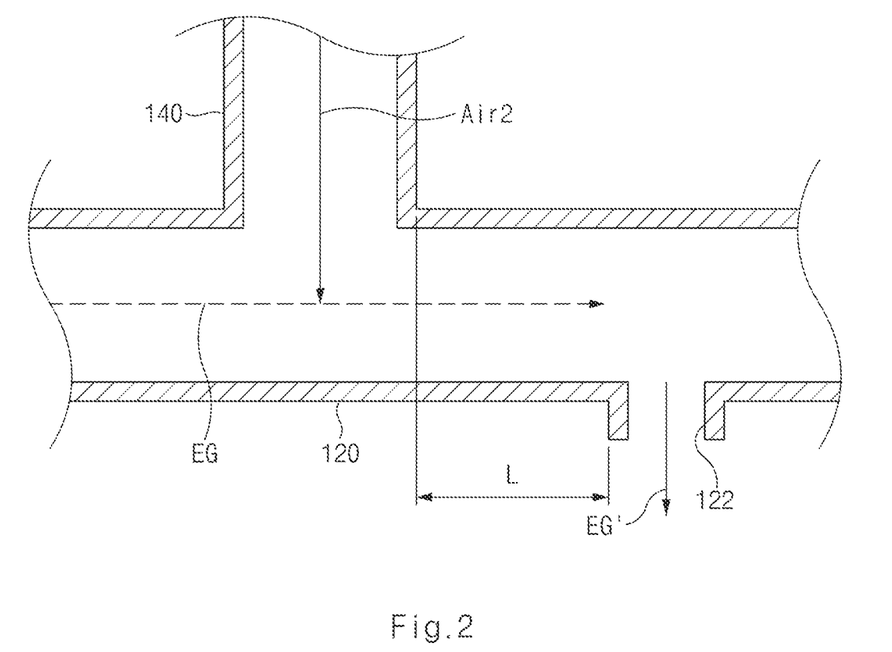
FIG. 2 is a cross-sectional view of part 'A' in FIG. 1.
Figure 4:
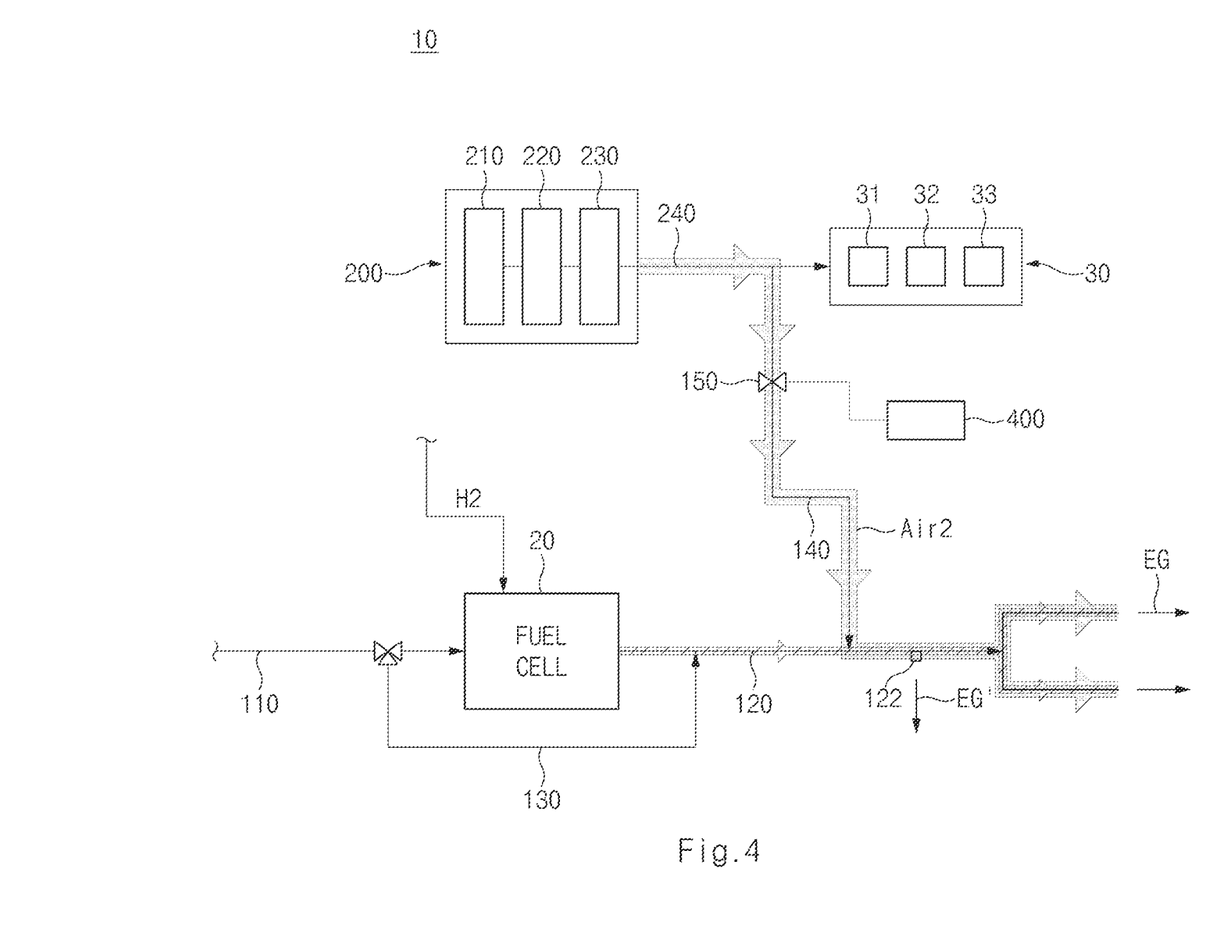
FIGS. 4 and 5 are views for explaining a flow of air and a flow of reaction air in a purge mode in the fuel cell system according to the embodiment of the present disclosure.

Referring to FIGS. 1, 2, and 4, the pneumatic supply unit 200 may have various structures capable of supplying the air Air 2 to the pneumatic parts 30. The present disclosure is not restricted or limited by the structure of the pneumatic supply unit 200.

For example, the pneumatic supply unit 200 may include an air compressor 210 configured to compress the air Air 2, a storage tank 220 configured to store the air Air 2 compressed by the air compressor 210, and a pneumatic line 240 configured to connect the storage tank 220 and the pneumatic parts 30 and supply the air Air 2 from the storage tank 220 to the pneumatic parts 30.

Various air compressors 210 capable of compressing the air Air 2 may be used as the air compressor 210. The present disclosure is not restricted or limited by the type and structure of the air compressor 210. For example, the air compressor 210 may be configured to compress and supply the air Air 2 using a centrifugal force generated by a rotation of a rotor (not illustrated).

The storage tank 220 may have various structures each having a storage space therein. The present disclosure is not restricted or limited by the type and structure of the storage tank 220.

One end of the pneumatic line 240 may be connected to the storage tank 220, and the other end of the pneumatic line 240 may be connected to the pneumatic parts 30. The air Air 2 stored in the storage tank 220 may be supplied to the pneumatic parts 30 along the pneumatic line 240.

Further, the inlet end of the pneumatic branch line 140 may be connected to the pneumatic line 240, and the outlet end of the pneumatic branch line 140 may be connected to the discharge line 120. A part of the air Air 2 to be supplied to the pneumatic parts 30 from the pneumatic supply unit 200 may be supplied to the discharge line 120 along the pneumatic branch line 140.

In particular, the fuel cell system 10 may include a regulator 230 disposed in the pneumatic line 240 and configured to reduce a pressure of the air Air 2 being supplied along the pneumatic line 240. Therefore, it is possible to supply the air Air 2, which is being supplied along the pneumatic line 240, to the pneumatic parts 30 (or the pneumatic branch line) in the state in which the pressure of the air Air 2 is reduced by the regulator 230.

As illustrated in FIG. 4, according to the embodiment of the present disclosure described above, a part of the air Air 2 to be supplied to the pneumatic parts 30 of the vehicle may be supplied to the discharge line 120 along the pneumatic branch line 140. Therefore, it is possible to obtain an advantageous effect of reducing a hydrogen concentration in the exhaust gas EG finally discharged to the outlet of the discharge line 120, thereby reducing a risk of explosion.

According to the exemplary embodiment of the present disclosure, the fuel cell system 10 may include a drain port 122 disposed on the discharge line 120 and configured to discharge condensate water, discharged from the fuel cell stack 20, to the outside.

The drain port 122 may be disposed at various positions in accordance with required conditions and design specifications. For example, the drain port 122 may be spaced apart from a distal end (the outlet tube) of the discharge line 120 at a predetermined distance.

In particular, the outlet end of the pneumatic branch line 140 may be disposed at an upstream side of the drain port 122 and connected to the discharge line 120.

This is based on the fact that a part of the exhaust gas EG is discharged at the same time when the condensate water is discharged through the drain port 122. Since the outlet end of the pneumatic branch line 140 is disposed at the upstream side of the drain port 122 and connected to the discharge line 120, the air (e.g., Air 2) is supplied to the exhaust gas EG before the exhaust gas EG is discharged through the drain port 122, which makes it possible to reduce the hydrogen concentration in the exhaust gas EG. Therefore, it is possible to obtain an advantageous effect of reducing a hydrogen concentration in exhaust gas EG' discharged through the drain port 122.

In addition, the outlet end of the pneumatic branch line 140 may be connected to the discharge line 120 and spaced apart from the drain port 122 within a preset reference distance L.

Since the outlet end of the pneumatic branch line 140 is spaced apart from the drain port 122 within the preset reference distance as described above, the air Air 2 may be supplied before the exhaust gas EG' is discharged through the drain port 122, such that the exhaust gas EG' discharged through the drain port 122 may maintain a maximally low hydrogen concentration.

The reference distance L (the distance between the drain port and the outlet end of the pneumatic branch line) may be variously changed in accordance with required conditions and design specifications. In particular, the reference distance L may be 50 mm to 150 mm.

That is, if the distance (reference distance) L between the drain port 122 and the outlet end of the pneumatic branch line 140 is shorter than 50 mm, the efficiency in discharging the condensate water and the exhaust gas EG' through the drain port 122 may deteriorate. If the distance (reference distance) L between the drain port 122 and the outlet end of the pneumatic branch line 140 is longer than 150 mm, it is difficult to effectively reduce a hydrogen concentration in the exhaust gas EG' immediately before the exhaust gas EG' is discharged through the drain port 122. Therefore, the distance (reference distance) L between the drain port 122 and the outlet end of the pneumatic branch line 140 may be 50 mm to 150 mm.

More particularly, the reference distance L (the distance between the drain port and the outlet end of the pneumatic branch line) may be 100 mm.

According to the exemplary embodiment of the present disclosure, the outlet end of the pneumatic branch line 140 may be disposed to be perpendicular to the discharge line 120.

Since the outlet end of the pneumatic branch line 140 is connected to be perpendicular to the discharge line 120 as described above, the air Air 2 supplied into the discharge line 120 along the pneumatic branch line 140 may perpendicularly collide with an inner surface of the discharge line 120 and then be effectively dispersed (diffused). Therefore, it is possible to obtain an advantageous effect of further improving efficiency in mixing the exhaust gas EG and the air Air 2 and more effectively reducing the hydrogen concentration in the exhaust gas EG.

According to the exemplary embodiment of the present disclosure, the fuel cell system 10 may include an on-off valve 150 disposed in the pneumatic branch line 140 and configured to selectively open or close the pneumatic branch line 140.

Various valves capable of selectively opening or closing the pneumatic branch line 140 may be used as the on-off valve 150. The present disclosure is not restricted or limited by the type and structure of the on-off valve 150.

For example, a typical solenoid valve, a butterfly valve, or the like may be used as the on-off valve 150.

For reference, in the embodiment of the present disclosure, the operation of selectively opening or closing the pneumatic branch line 140 may include both an operation of turning on or off the flow of the air Air 2 passing through the pneumatic branch line 140 and an operation of adjusting a flow rate of the air Air 2 passing through the pneumatic branch line 140.

Figure 3:
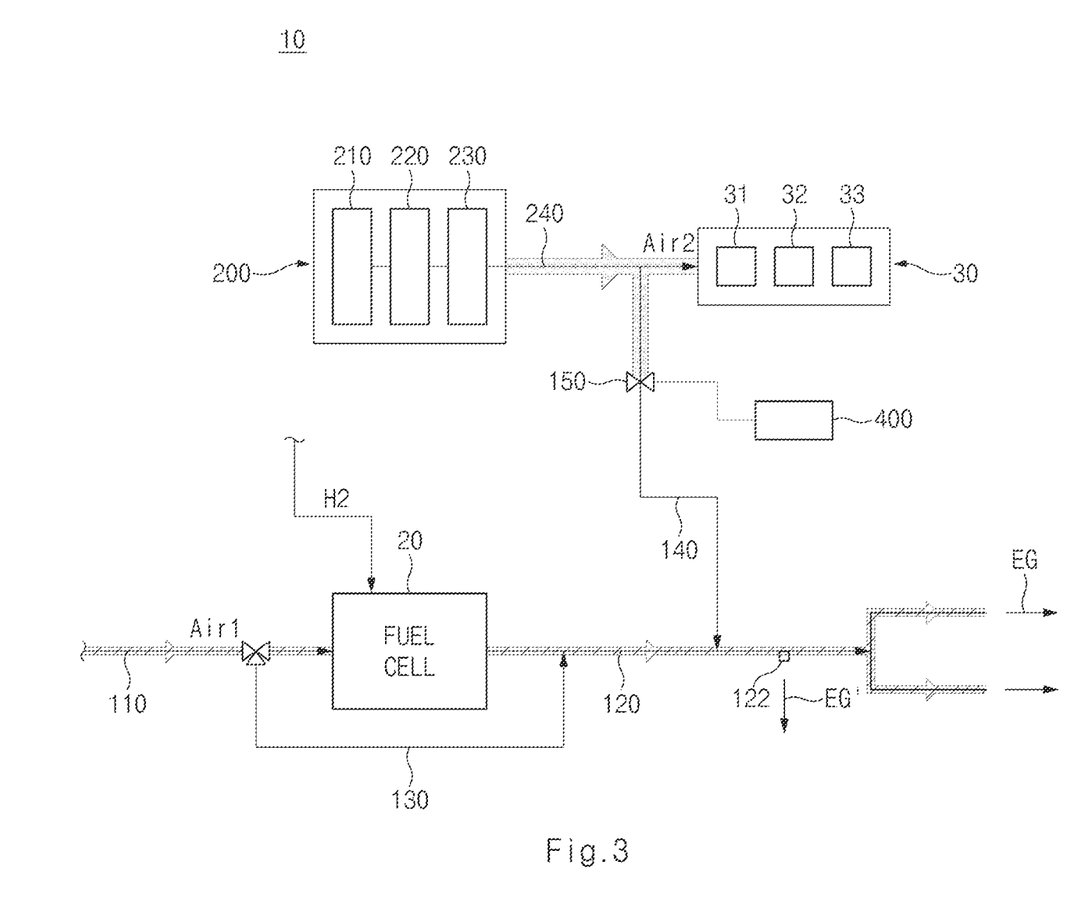
FIG. 3 is a view for explaining a flow of air and a flow of reaction air in the fuel cell system according to the embodiment of the present disclosure.

Referring to FIG. 3, when the hydrogen concentration in the exhaust gas EG finally discharged to the outlet of the discharge line 120 meets the regulations, the pneumatic branch line 140 may be closed by the on-off valve 150, such that the supply of the air Air 2 to the discharge line 120 may be stopped.

According to the exemplary embodiment of the present disclosure, the fuel cell system 10 may include a processor 400 configured to operate the air compressor 210 when a pressure of the air Air 2 (an internal pressure of the storage tank) is lower than a preset reference pressure before the on-off valve 150 opens the pneumatic branch line 140.

Since the air compressor 210 operates when the pressure of the air Air 2 is lower than the preset reference pressure before the pneumatic branch line 140 is opened as described above, the air Air 2 with a sufficient pressure (flow rate) may be supplied to the discharge line 120 when the pneumatic branch line 140 is opened.

For reference, the processor 400 may be electrically connected to the air compressor 210, a sensor for sensing the internal pressure of the storage tank 220, and the like. The processor 400 may electrically control the components. The processor 400 may be an electrical circuit that executes software commands, thereby performing various data processing and calculations to be described below.

The processor 400 may be implemented in the form of hardware, software, or a combination of hardware and software. Particularly, the processor 400 may be implemented as microprocessor.

For example, the processor 400 may be a central processing unit (CPU) or a semiconductor device that processes instructions stored in a memory and/or a storage. Examples of the memory and the storage may include various types of volatile or non-volatile storage media. Examples of the memory may include a read only memory (ROM) and a random-access memory (RAM).

Accordingly, steps of a method or algorithm described in connection with the embodiments disclosed herein may be directly implemented by a hardware module, a software module, or a combination thereof, executed by the processor 400. The software module may reside within a storage medium (i.e., a memory and/or a storage) such as a RAM memory, a flash memory, a ROM memory, an EPROM memory, an EEPROM memory, a register, a hard disc, a mountable disc, and a CD-ROM.

An exemplary storage medium is coupled to the processor 400, and the processor 400 may can read information from and write information to the storage medium. Alternatively, the storage medium may be integrated with the processor 400. The processor 400 and the storage medium may reside within an application-specific integrated circuit (ASIC). The ASIC may reside within a user terminal. Alternatively, the processor 400 and the storage medium may reside as separate components within the user terminal.

Figure 5:
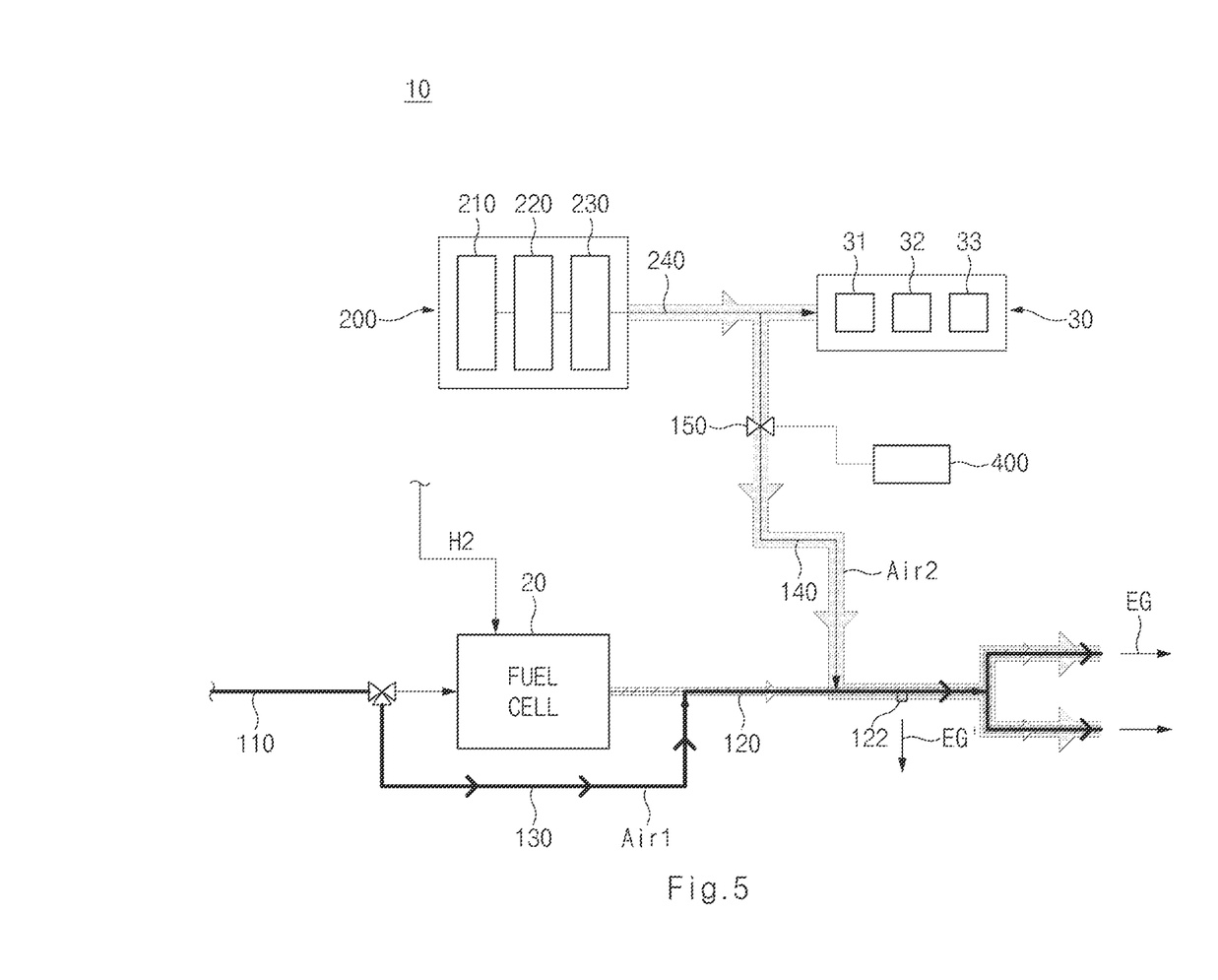

Referring to FIGS. 1, 2, and 5, according to the exemplary embodiment of the present disclosure, the fuel cell system 10 may include a bypass line 130 configured to connect the air supply line 110 and the discharge line 120 and selectively allow the reaction air Air 1 to flow from the air supply line 110 to the discharge line 120.

More specifically, one end of the bypass line 130 may be connected to the air supply line 110, and the other end of the bypass line 130 may be connected to the discharge line 120. The reaction air Air 1 supplied to the air supply line 110 may be supplied to the discharge line 120 along the bypass line 130 without passing through the fuel cell stack 20.

As described above, according to the embodiment of the present disclosure, the reaction air Air 1 supplied to the air supply line 110 may be supplied to the discharge line 120 along the bypass line 130 without passing through the fuel cell stack 20 at the same time when a part of the air Air 2 to be supplied to the pneumatic parts 30 of the vehicle is supplied to the discharge line 120 along the pneumatic branch line 140, such that a total amount of air to be supplied to the discharge line 120 (a total supply amount of air and reaction air) may further increase. Therefore, it is possible to obtain an advantageous effect of more effectively reducing the hydrogen concentration in the exhaust gas EG discharged through the discharge line 120.

Figure 6:
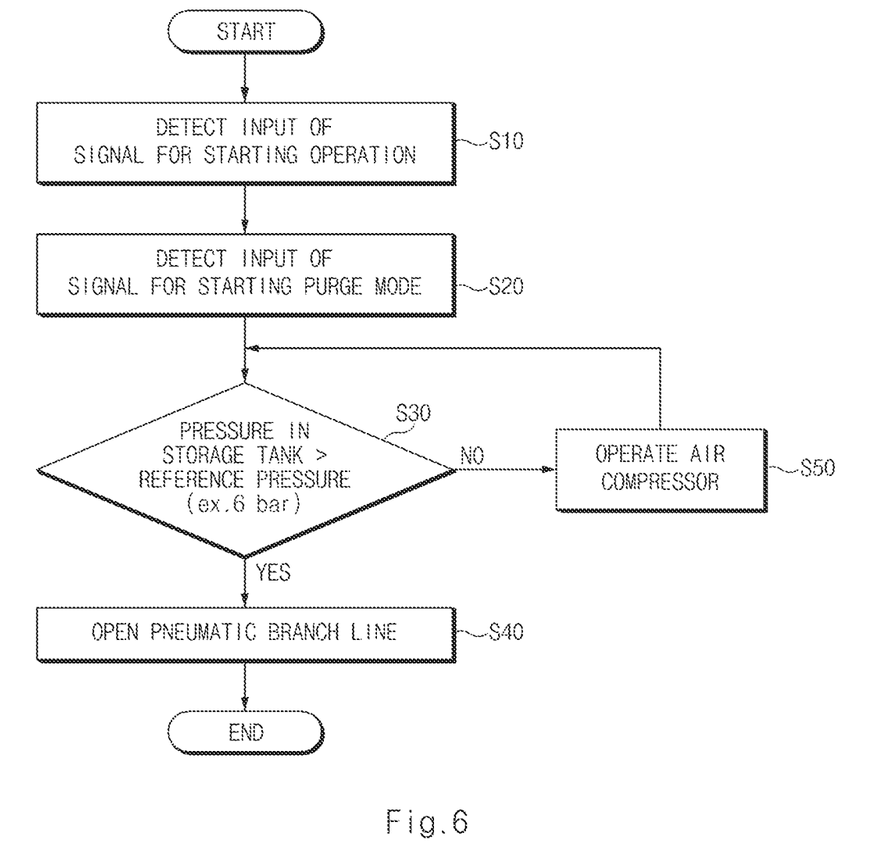
FIGS. 6 and 7 are flowcharts for explaining a method of controlling the fuel cell system according to the embodiment of the present disclosure.
Figure 7:
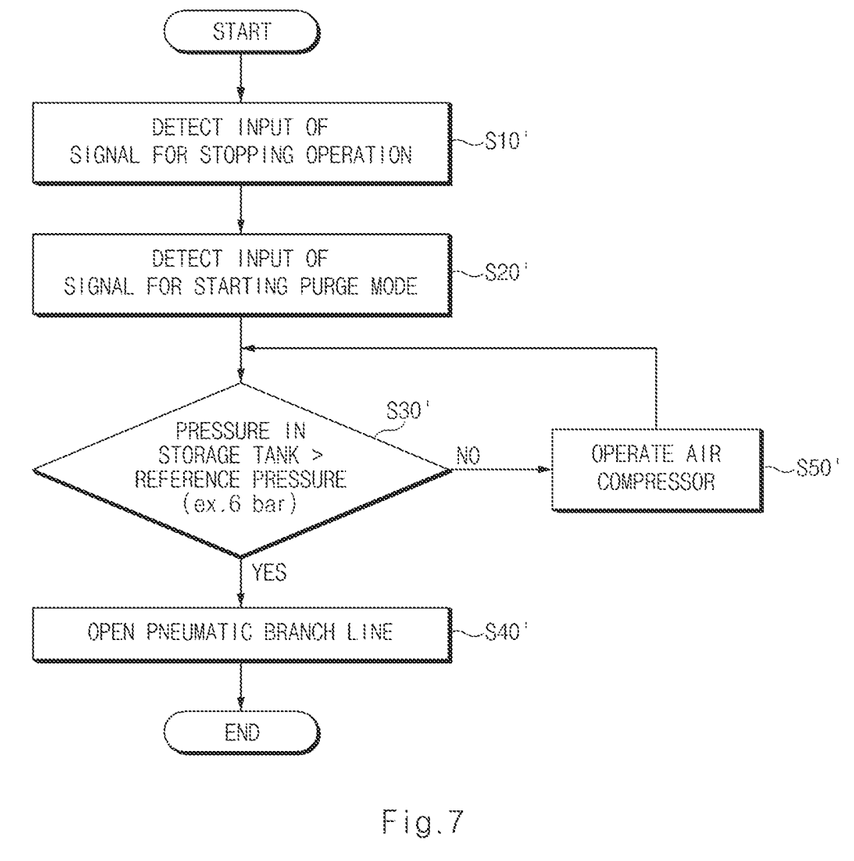

Meanwhile, FIGS. 6 and 7 are flowcharts for explaining a method of controlling the fuel cell system 10 according to the embodiment of the present disclosure. Further, the parts identical and equivalent to the parts in the above-mentioned configuration will be designated by the identical or equivalent reference numerals, and detailed descriptions thereof will be omitted.

According to the exemplary embodiment of the present disclosure, the supply of air to the discharge line 120 (the process of opening the pneumatic branch line) may be performed during a process in which the fuel cell stack 20 begins to operate again after the operation of the fuel cell stack 20 is stopped (or a process in which the vehicle begins to operate) or during a process in which the operation of the fuel cell stack 20 is ended (or a process in which the operation of the vehicle is ended).

For example, referring to FIG. 6, according to the exemplary embodiment of the present disclosure, the on-off valve 150 may be controlled to open at S40 the pneumatic branch line 140 and supply the air Air 2 to the discharge line 120 when an input of a signal for starting the operation of the fuel cell stack 20 may be detected at S10 in the state in which the operation of the fuel cell stack 20 is stopped, and an input of a signal for starting a purge mode may be detected at S20. Then, when it is determined at S30 that the pressure (air pressure) in the storage tank 220 is higher than a preset reference pressure (e.g., 6 bar), the pneumatic branch line 140 may be opened by controlling the on-off valve 150 at S40, such that the air Air 2 may be supplied to the discharge line 120. In contrast, when the pressure (air pressure) in the storage tank 220 is lower than the preset reference pressure, the air compressor 210 may operate at S50 until the pressure in the storage tank 220 reaches the reference pressure.

Further, in the state in which the input of the signal for starting the purge mode is detected, a drain valve (not illustrated) disposed in the fuel cell stack 20 (or the humidifier) may be opened, and the condensate water in the fuel cell stack 20 (or the humidifier) may be discharged to the outside through the drain port 122 of the discharge line 120.

As another example, referring to FIG. 7, according to another exemplary embodiment of the present disclosure, an input of a signal for stopping the operation of the fuel cell stack 20 may be detected at S10' in the state in which the fuel cell stack 20 operates, and an input of a signal for starting the purge mode may be detected at S20'. Then, when it is determined at S30' that the pressure (air pressure) in the storage tank 220 is higher than the preset reference pressure (e.g., 6 bar), the pneumatic branch line 140 may be opened by controlling the on-off valve 150 at S40', and the air Air 2 may be supplied to the discharge line 120. In contrast, when the pressure (air pressure) in the storage tank 220 is lower than the preset reference pressure, the air compressor 210 may operate at S50' until the pressure in the storage tank 220 reaches the reference pressure.

According to the embodiment of the present disclosure described above, it is possible to obtain an advantageous effect of reducing a hydrogen concentration in the exhaust gas discharged from the fuel cell stack.

In particular, according to the embodiment of the present disclosure, it is possible to obtain an advantageous effect of effectively reducing a hydrogen concentration in the exhaust gas, discharged from the fuel cell stack, using the air to be supplied to the pneumatic parts of the vehicle.

In addition, according to the embodiment of the present disclosure, it is possible to obtain an advantageous effect of simplifying the structure and improving the spatial utilization and the degree of design freedom.

In addition, according to the embodiment of the present disclosure, it is possible to obtain an advantageous effect of improving the safety and reliability.

In addition, according to the embodiment of the present disclosure, it is possible to obtain an advantageous effect of simplifying the manufacturing process and reducing the costs.

In addition, according to the embodiment of the present disclosure, it is possible to obtain an advantageous effect of ensuring the durability of the fuel cell and prolonging the lifespan of the fuel cell.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

The invention claimed is:

1. A fuel cell system comprising:
a discharge line configured to discharge exhaust gas from a fuel cell stack to an outside;
a pneumatic branch line having an outlet end connected to the discharge line, and an inlet end connected to a pneumatic supply unit configured to supply air to a pneumatic part of a mobility vehicle, the pneumatic branch line being configured to selectively supply the air from the pneumatic supply unit to the discharge line; and
a drain port positioned on the discharge line and configured to discharge condensate water, which is discharged from the fuel cell stack, to the outside.

2. The fuel cell system of claim 1, wherein the pneumatic supply unit comprises:
an air compressor configured to compress the air;
a storage tank configured to store the air compressed by the air compressor; and a pneumatic line configured to connect the storage tank and the pneumatic part and supply the air from the storage tank to the pneumatic part; and wherein the pneumatic branch line connects the pneumatic line and the discharge line.

3. The fuel cell system of claim 2, comprising:

a regulator positioned on the pneumatic line and configured to reduce a pressure of the air.

4. The fuel cell system of claim 1, wherein the outlet end of the pneumatic branch line is positioned at an upstream side of the drain port and connected to the discharge line.

5. The fuel cell system of claim 4, wherein the outlet end of the pneumatic branch line is connected to the discharge line and spaced apart from the drain port.

6. The fuel cell system of claim 5, wherein a distance between the drain port and the outlet end of the pneumatic branch line is 50 mm to 150 mm.

7. The fuel cell system of claim 1, wherein the outlet end of the pneumatic branch line is positioned perpendicular to the discharge line.

8. The fuel cell system of claim 2, comprising:

an on-off valve positioned on the pneumatic branch line and configured to selectively open or close the pneumatic branch line.

9. The fuel cell system of claim 8, comprising:

a processor configured to operate the air compressor when a pressure of the air is lower than a preset reference pressure before the on-off valve opens the pneumatic branch line.

10. The fuel cell system of claim 1, comprising:

an air supply line configured to supply reaction air to the fuel cell stack; and a bypass line configured to connect the air supply line and the discharge line and selectively allow the reaction air to flow from the air supply line to the discharge line.

* * * * *